US012777029B2

(12) United States Patent
Kurahashi

(10) Patent No.: US 12,777,029 B2
(45) Date of Patent: Oct. 27, 2026

(54) DEVICE MANAGEMENT SYSTEM AND PROCESSING METHOD

(71) Applicant: CANON KABUSHIKI KAISHA, Tokyo (JP)

(72) Inventor: Yuichi Kurahashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 116 days.

(21) Appl. No.: 19/012,651

(22) Filed: Jan. 7, 2025

(65) Prior Publication Data

US 2025/0233855 A1 Jul. 17, 2025

(30) Foreign Application Priority Data

Jan. 12, 2024 (JP) ................................ 2024-003224

(51) Int. Cl.
*H04L 9/40* (2022.01)

(52) U.S. Cl.
CPC .................................... *H04L 63/08* (2013.01)

(58) Field of Classification Search
None
See application file for complete search history.

(56) References Cited

U.S. PATENT DOCUMENTS 9,589,397 B1* 3/2017 Christopher .......... H04W 12/06
12,348,511 B2* 7/2025 Gong .................... H04W 12/06
2016/0212099 A1* 7/2016 Zou ......................... H04L 63/08
2019/0230063 A1* 7/2019 McCready .............. H04L 63/08
2019/0340819 A1* 11/2019 Chandrashekarappa .................... G06F 9/451
2020/0213360 A1* 7/2020 Ojha ................... H04L 41/0668
2022/0337611 A1* 10/2022 Brazao ................. G06Q 30/018
2023/0208831 A1* 6/2023 Gong ........................ H04L 9/40 726/7
2024/0129291 A1* 4/2024 Tsai .................... H04L 63/0823
(Continued)

FOREIGN PATENT DOCUMENTS

JP 2014081779 A 5/2014
JP 2021125761 A 8/2021

*Primary Examiner* — Khalid M Almaghayreh
(74) *Attorney, Agent, or Firm* — Canon U.S.A., Inc. IP Division

(57) ABSTRACT

When a connection code from a device matches one for identifying a connection destination organization in correspondence with the device, a connection permission unit issues, to the device, key information for connection to the connection destination organization identified based on the connection code. When deletion of the connection destination organization is instructed, a device information registration unit stores the key information of the device in correspondence with the connection destination organization and registers a connection destination organization as a changed destination. When authentication of the key information from the device succeeds and the connection destination organization as the changed destination is registered, the connection permission unit transmits, to the device, a connection code to identify the connection destination organization at the changed destination, and permits the device to connect to the connection destination organization when the authentication is successful and the connection destination organization as the changed destination is unregistered.

6 Claims, 5 Drawing Sheets

(56) References Cited

U.S. PATENT DOCUMENTS

| | | | | |
|---|---|---|---|---|
| 2024/0134958 | A1* | 4/2024 | Li | G06F 21/45 |
| 2024/0214379 | A1* | 6/2024 | Li | H04L 63/0876 |

* cited by examiner

FIG. 6

600

| TENANT ID | DEVICE ID | SERIAL NUMBER | DEVICE NAME | MANAGEMENT FORM | REGISTRATION DATE AND TIME |
|---|---|---|---|---|---|
| 20001 | 11111111-1111-1111-1111-111111111111 | DEV00001 | DEVICE A | INDIVIDUAL MANAGEMENT | 2022/12/1 10:00 |
| 20001 | 22222222-2222-2222-2222-222222222222 | DEV00002 | DEVICE B | INDIVIDUAL MANAGEMENT | 2022/12/8 10:00 |
| 20002 | 33333333-3333-3333-3333-333333333333 | DEV00003 | DEVICE C | CENTRALIZED MANAGEMENT | 2022/12/15 10:00 |

FIG. 7

700

| TENANT ID | CONNECTION CODE | VALIDITY PERIOD |
|---|---|---|
| 20001 | 12345678 | 2023/12/1 8:00 |
| 20002 | 34567890 | 2023/12/1 10:00 |

FIG. 8

800

| TENANT ID | DEVICE ID | CREDENTIAL | STATUS | RECONNECTION DESTINATION TENANT |
|---|---|---|---|---|
| 20001 | 11111111-1111-1111-1111-111111111111 | ******** | VALID | 1001 |
| 20001 | 22222222-2222-2222-2222-222222222222 | ******** | INVALID | |
| 20002 | 33333333-3333-3333-3333-333333333333 | ******** | VALID | |

DEVICE MANAGEMENT SYSTEM AND PROCESSING METHOD

BACKGROUND

Field

The present disclosure relates to a device management system and a processing method.

Description of the Related Art

With spread of a cloud service and IoT, a system is emerging in which data of a network device such as an image formation apparatus in connection with a communication control apparatus is collected via a network, and the data is used to provide a service to a customer. Herein, IoT refers to Internet of Things. In such a system, information of network devices is registered in a device management server configured to manage connection of the network devices of a plurality of customer companies, and thus, a service provision company can use the system.

In a case where a service of a network device is to be provided to a certain customer company, a person in charge in the service provision company newly creates a tenant and allocates the tenant to the customer company. Then, to manage the network device for each customer company, the network device is registered in the device management server in association with the tenant allocated to the customer company (hereinafter, referred to as a customer tenant). The network device establishes connection by authenticating information for identifying the network device registered in the device management server and a communicating function to be used to provide the service is activated. Since the network device and the customer tenant are in association with each other, the data of the network device to be collected via the network can also be managed in a logically separated area for each customer in association with the customer tenant, and it is possible to provide a safe tenant separated environment to the customer company.

According to a technique disclosed in Japanese Patent Laid-Open No. 2014-81779, a customer company at a registration destination is identified from among a plurality of customer companies managed by a service provision company by a network device installed in the customer company, and the identified customer company is registered in the device management server. In particular, according to a technique disclosed in a third embodiment of Japanese Patent Laid-Open No. 2014-81779, the device management server issues a connection code for each customer tenant, and by transmitting the input connection code to the device management server, the network device is registered in association with the customer tenant. Since the network device is not to be connected to the device management server unless the connection code is found, unnecessary connection or connection to an incorrect customer tenant can be avoided.

According to a technique disclosed in Japanese Patent Laid-Open No. 2021-125761, a system is provided in which upon registration of the network device in association with the customer tenant, an installation operation can be performed based on a connection code issued to a sales company which performs the installation. Instead of issuing, to each user of the network device or each customer tenant, a connection code for connecting the network device, the connection code issued to the sales company which performs the installation is used. After a step of performing the registration in association with the tenant of the sales company, by allowing an instruction for re-association with the customer tenant to be issued from the device management server to the network device, trouble of issuing and distributing the connection code to each user of the network device or each customer tenant is reduced.

By registering the network device in association with the customer tenant, it is possible to manage the network device or the data of the network device in a logically separated area for each customer. However, because the management is performed in the separated area, when the customer tenant is deleted from the device management server, a transmission destination of the data of the network device no longer exists, but also information of the registered network device is also deleted.

Along with the deletion of the information of the network device, authentication information for the network device to establish connection to the device management server is also deleted, and the connection of the network device to the device management server is also cut off. In a case where the customer tenant is deleted once to continuously use the network device for a different customer or a case where the customer tenant has been deleted by an erroneous operation too, the connection of the network device is cut off by the operation on the device management server. Once the authentication information is deleted and the connection is cut off, when the customer tenant is simply created or the information of the network device is simply registered, the connection to the device management server is not resumed, and it becomes necessary to perform a connection code input operation to the network device.

If the connection can be switched to the customer tenant after the registration have been performed at least once as the tenant of the sales company, even when the customer tenant is not to be created, the installation operation for the connection to the device management server can be completed. However, after the connection has been switched to the customer tenant, when the customer tenant is deleted from the device management server, the connection of the network device to the device management server is cut off.

SUMMARY

A device management system according to an aspect of the present disclosure is a device management system including a device and a device management server, in which the device management server includes a device information registration unit configured to register, in response to a registration request, the device and a connection destination organization in the device management server in correspondence with each other, a connection code issuance unit configured to issue a connection code for identifying the connection destination organization, and a connection permission unit configured to issue, in a case where a connection code received from the device is the same as the connection code for identifying the connection destination organization in correspondence with the device, key information to the device which is used for connection to the connection destination organization identified based on the connection code, and permit the device to connect to the connection destination organization in a case where authentication of the key information received from the device is successful. In a case where deletion of the connection destination organization is instructed, the device information registration unit stores the key information of the device in correspondence with the connection destination organization without deleting the key information and registers a connection destination organization as a changed destination. The connection permission unit transmits, in a case where the authentication of the key information received from the device is successful and the connection destination organization as the changed destination is registered, a connection code to the device which is used to identify the connection destination organization as the changed destination and permits the device to connect to the connection destination organization in a case where the authentication of the key information received from the device is successful and the connection destination organization as the changed destination is not registered.

Further features of the present disclosure will become apparent from the following description of exemplary embodiments with reference to the attached drawings.

BRIEF DESCRIPTION OF THE DRAWINGS

FIG. 6 illustrates an example of a device management information table.

FIG. 7 illustrates an example of a connection code management table.

FIG. 8 illustrates an example of a device connection credential information table.

DESCRIPTION OF THE EMBODIMENTS

Hereinafter, the present embodiment will be described with reference to the drawings.

Figure 1:
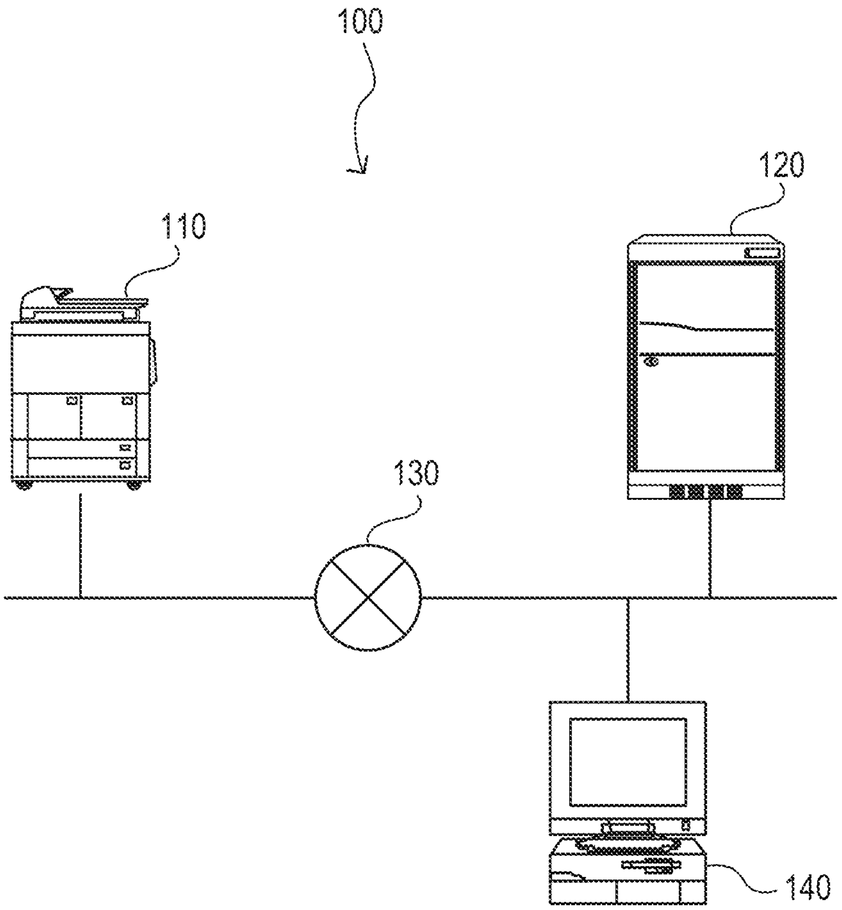
FIG. 1 illustrates a configuration example of a device management system.

FIG. 1 illustrates a configuration example of a device management system 100 according to the present embodiment. The device management system 100 of the present embodiment includes a network device 110, a device management server 120, a network 130, and a client terminal 140.

The network device 110 is a processing apparatus in a network of a customer company which is connected to the device management server 120 via the network 130 such as the Internet. The network device 110 includes an image processing apparatus such as a printer, a copier, or a scanner. In FIG. 1, the single network device 110 is illustrated, but a plurality of network devices may be present in the network of the customer company, or network devices of a plurality of customer companies may be present.

The network device 110 is connected to the device management server 120 by a server connection application which operates on the network device 110 and transmits setting information or operational information of the network device 110 to the device management server 120. When transmitting the setting information or the operational information, the network device 110 performs a device authentication on the device management server 120 and obtains connection permission information such as an access token or a session ID. The network device 110 transmits the setting information or the operational information together with the obtained connection permission information to the device management server 120.

The device management server 120 is a server apparatus configured to authenticate the network device 110 on a cloud and receive and manage the setting information or the operational information. When the network device 110 is to be connected to the device management server 120, the network device 110 is registered in advance in the device management server 120 to manage the network device 110 with its owner identified.

The device management server 120 sets a correspondence between a customer company which owns the network device 110 or a service provision company which manages the network device 110 and the network device 110 to logically separate and manage the information for each customer company or each service provision company. When the device management server 120 is to receive the setting information or the operational information, the device authentication of the network device 110 is performed based on the registered information to issue the connection permission information and wait for reception of the setting information or the operational information.

The client terminal 140 is a client terminal directly operated by a user of the service provision company. A web browser is installed in the client terminal 140.

Figure 2:
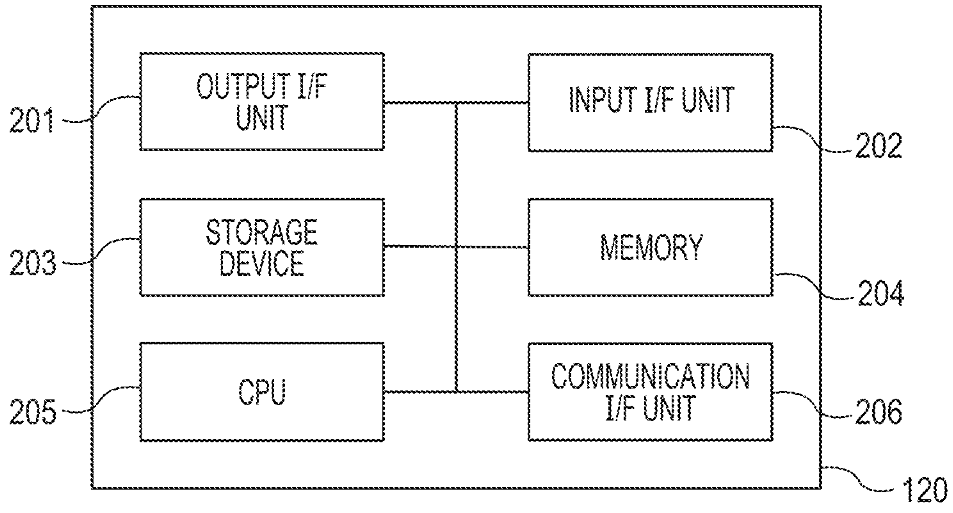
FIG. 2 illustrates a hardware configuration example of a device management server.

FIG. 2 illustrates a hardware configuration example of a server computer configured to realize the device management server 120 according to the present embodiment. The device management server 120 includes an output I/F unit 201 configured to connect to an output apparatus such as a display, an input I/F unit 202 configured to connect to an input apparatus such as a keyboard, a storage device 203, a memory 204, a central processing unit (CPU) 205, and a communication I/F unit 206.

The storage device 203 stores an OS, an authentication program for performing authentication or connection processing, a management program for registering and managing the network device 110, registration information of the customer company or the network device 110, the setting information or the operational information which has been received, or the like. Herein, the OS is an operating system.

The CPU 205 loads and executes the authentication program or the management program from the storage device 203 onto the memory 204.

The communication I/F unit 206 is a network interface connected to the network 130 in FIG. 1 and configured to control communication with the network device 110 which constitutes the device management system 100.

It is noted that the diagram depicting the hardware configuration illustrated in FIG. 2 is equivalent to a hardware block diagram of a general information processing apparatus and also applies to the network device 110 or the client terminal 140 of the present embodiment. Therefore, the same hardware configuration also applies to that of the network device 110.

Figure 3:
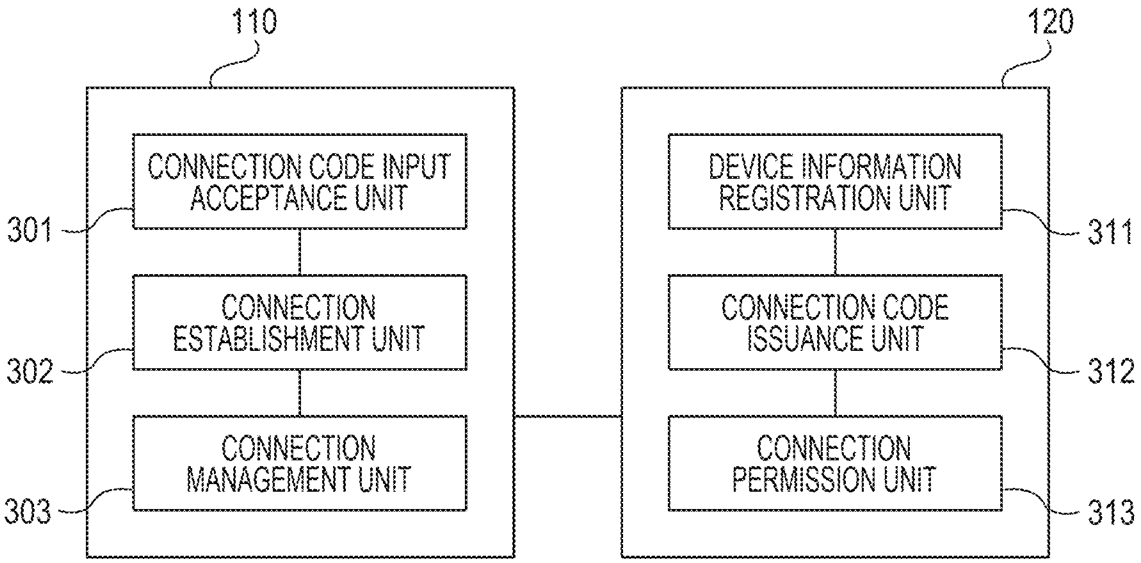
FIG. 3 illustrates a functional configuration example of the device management system.

FIG. 3 illustrates a functional configuration example of the network device 110 and the device management server 120 which constitute the device management system 100.

The network device 110 includes a connection code input acceptance unit 301, a connection establishment unit 302, and a connection management unit 303.

To logically separate and manage data for each organization of the customer company or the service provision company, the device management server 120 creates a tenant serving as a virtual organization in the device management server 120 and allocates the created tenant to the customer company or the service provision company. By registering the network device 110 in advance in the tenant allocated to the customer company or the service provision company, the device management server 120 can separate and manage the data of the network device 110 by tenant.

The connection code input acceptance unit 301 accepts an input of a connection code. The input of the connection code is performed by way of optical character recognition (OCR) using the input I/F unit 202, scanning of a two-dimensional barcode, and the like in addition to an input based on a hard key of the network device 110 or a touch panel operation.

A connection code is a character string for identifying a tenant at a connection destination of the network device 110 in the device management server 120 and is used for the device management server 120 to permit connection. Since it is necessary to input the connection code upon connection to the device management server 120, connection from the network device 110 without the input of the connection code can be avoided, and it is possible to connect to only the tenant specified at the time of the issuance of the connection code.

The connection establishment unit 302 establishes connection to the device management server 120 by transmitting the connection code input in the connection code input acceptance unit 301 to the device management server 120 and receiving an issuance of credential information from the device management server 120.

The connection management unit 303 stores the credential information issued from the device management server 120 and performs the authentication on the device management server 120 using the credential information to transmit the data such as the setting information or the operational information which is to be used to provide the service so that a connection state is managed.

In addition, according to the present embodiment, in a case where reconnection information of the tenant is registered in the device management server 120 at the time of the authentication on the device management server 120, in particular, the connection management unit 303 receives a connection code for performing reconnection to the tenant from the device management server 120.

The device management server 120 includes a device information registration unit 311, a connection code issuance unit 312, and a connection permission unit 313.

The device information registration unit 311 is a functional block configured to register the information of the network device 110 in the tenant which is to be installed in the customer organization and logically separate and manage the network device 110 by tenant. The device information registration unit 311 registers the information of the customer organization to be provided with the service in association with the tenant, based on a registration request from the user, and registers the information of the network device 110 which provides the service in the tenant in association with the customer organization.

When the provision of the service is ended, the device information registration unit 311 deletes the information of the network device 110 from the tenant and deletes the information of the network device 110 for each tenant in association with the customer organization.

FIG. 6 illustrates an example of a device management information table 600 registered by the device information registration unit 311 in the storage device 203 of the device management server 120.

A tenant ID in FIG. 6 is key information for logical separation and management by tenant and is a tenant ID indicating the tenant in which the network device 110 has been registered.

A device ID is ID information allocated by the device management server 120 when the network device 110 is registered in the device management server 120 to uniquely identify the network device 110 in the device management server 120. Information of a plurality of network devices 110 can be registered in the single tenant ID.

A serial number is individual identification information of the network device 110 which has been allocated at the time of manufacture of the network device 110.

In addition to this, the device management information table 600 in FIG. 6 has information such as a device name, a management form, registration date and time, or installation location information, as the information of the network device 110.

The management form is a management form of the network device 110 and is individual management or centralized management. The individual management is, for example, information representing a classification of a management method in which connection to the device management server 120 is individually managed by each of the network devices 110. The centralized management is, for example, information representing a classification of a management method in which connections of the plurality of network devices 110 are managed in a centralized manner by another management device.

In response to a registration request, the device information registration unit 311 registers the tenant ID, the device ID, the serial number, the device name, and the management form in correspondence with each other as in the device management information table 600. The tenant indicated by the tenant ID is an example of a connection destination organization in the device management server 120.

The connection code issuance unit 312 generates a connection code which is used to identify a tenant at the connection destination of the network device 110 and which is used for the device management server 120 to permit connection. The connection code issuance unit 312 issues the connection code for identifying the tenant.

FIG. 7 illustrates an example of a connection code management table 700 generated by the connection code issuance unit 312 and stored in the storage device 203 of the device management server 120.

The tenant ID in FIG. 7 is key information for logical separation and management by tenant similarly as in the tenant ID in FIG. 6 and is ID information for uniquely identifying the tenant allocated to the customer company.

The connection code is a code that is unique in the device management server 120, and one or more connection codes can be generated for each tenant ID. Alternatively, a single connection code may be generated for each of the network devices 110 registered in the device management information table 600.

The generation of the connection code is performed in response to a reconnection request of the tenant from the network device 110 according to the present embodiment, and the connection code has a validity period in many cases. Since the connection code is unique in the device management server 120, the tenant ID can be identified based on the connection code.

The connection permission unit 313 plays a role of an authentication server and receives a valid connection code to identify the tenant at the connection destination based on the connection code, so that key information for transmitting data to the tenant identified by the device management server 120 is issued to the network device 110.

FIG. 8 illustrates an example of a device connection credential information table 800 which is managed by the connection permission unit 313 in the storage device 203 of the device management server 120.

The tenant ID in FIG. 8 is key information for logical separation and management by tenant similarly as in the tenant ID in FIG. 6 and is ID information for uniquely identifying the tenant allocated to the customer company.

The device ID is ID information for uniquely identifying the network device 110 in the device management server 120 similarly as in the device ID in FIG. 6.

A credential is key information for authenticating the network device 110. At the time of reception of a data transmission request from the network device 110, the connection permission unit 313 authenticates the network device 110 using the device ID and this key information and grants a permission of connection to the network device 110.

A status is status information indicating an issuance status of the key information to the network device 110. When the connection permission unit 313 issues the key information to the network device 110, the connection to the network device 110 is activated, and the status becomes "valid". When the key information has not been issued to the network device 110, the status becomes "invalid".

A reconnection destination tenant is a tenant ID indicating a tenant as a changed destination when a different tenant is to be reregistered as the tenant to which the network device 110 is connected. The reconnection destination tenant is usually empty, but the tenant as the changed destination can be registered. When the tenant as the changed destination is registered, instead of granting the permission of connection to the network device 110 when the network device 110 is authenticated, the connection permission unit 313 instructs the network device 110 to perform reconnection to the tenant specified as the reconnection destination tenant.

In response to an operation by the user of the service provision company, the client terminal 140 can refer to the information of the network device 110 of the tenant of the customer company managed by the service provision company and created under the tenant of the service provision company in the device management server 120.

As a result, the service provision company can provide a device management service such as a maintenance service of the network device 110 of the customer company to the customer company.

In a case where a connection code received from the network device 110 is the same as the connection code for identifying the tenant in correspondence with the network device 110, the connection permission unit 313 issues key information (credential) to connect to the tenant identified based on the connection code to the network device 110.

Then, in a case where the authentication of the key information received from the network device 110 is successful, the connection permission unit 313 permits the network device 110 to connect to the tenant.

Figure 4:
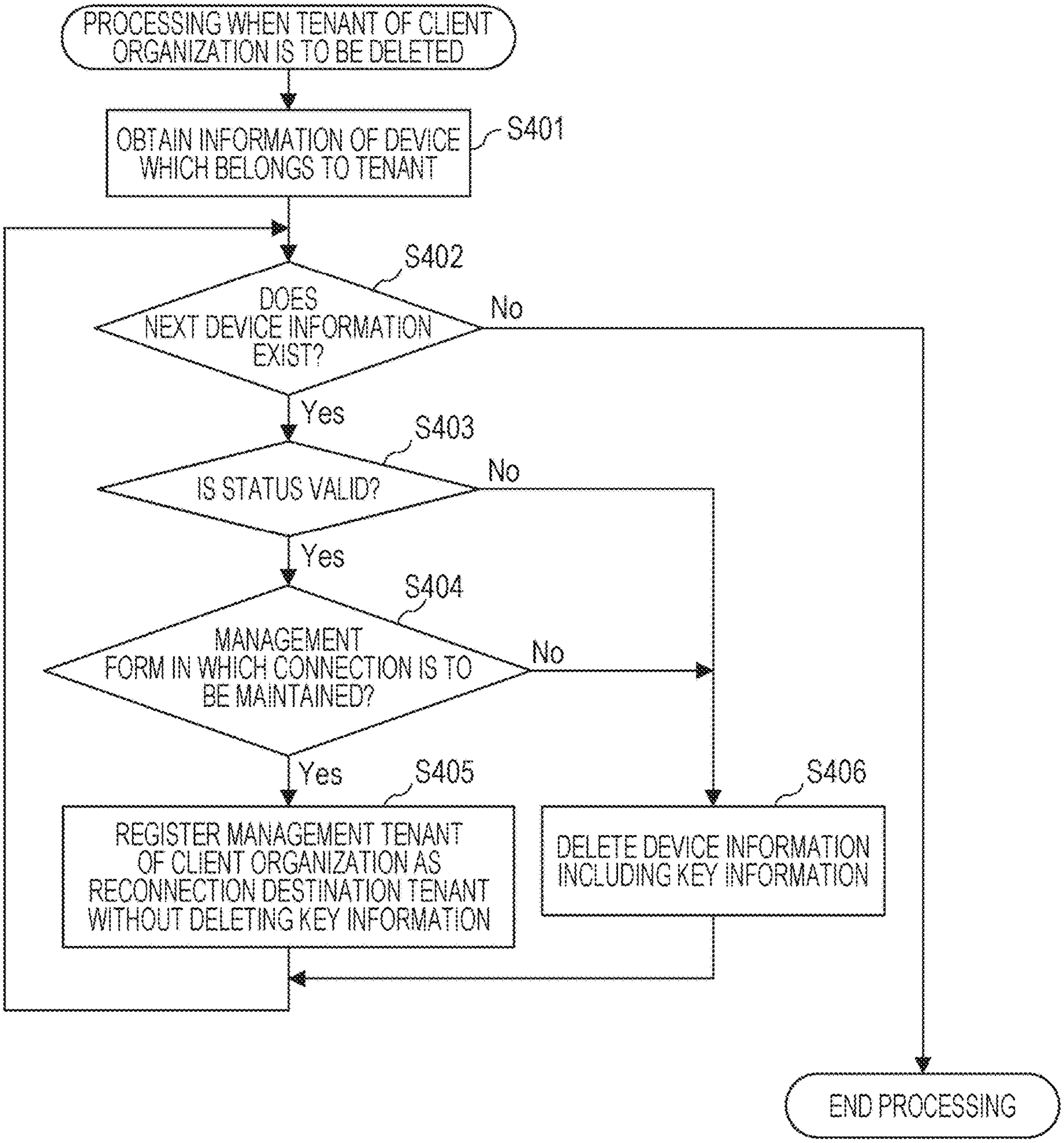
FIG. 4 is a flowchart of tenant deletion processing of a device information registration unit.

FIG. 4 is a flowchart illustrating a processing method for the device management server 120 according to the present embodiment. FIG. 4 is the flowchart illustrating processing of deleting the information of the network device 110, in particular, for each tenant in association with the customer organization in the processing of deleting the information of the network device 110 in the device information registration unit 311 of the device management server 120.

Hereinafter, tenant deletion processing in the device information registration unit 311 when an operation of deleting the tenant in association with the customer organization is performed will be described following the flowchart in FIG. 4. It is noted that a management program of the device management server 120 according to the flow in FIG. 4 is stored in the storage device 203 of the device management server 120 and read into the memory 204 to be executed by the CPU 205.

In the tenant deletion processing in the device information registration unit 311, first, processing in step S401 is performed in a case where deletion of a tenant has been instructed.

In step S401, the device information registration unit 311 obtains information of one or more network devices 110 belonging to the tenant of the customer organization which has been specified by the deletion operation from the information of the network device 110 in FIG. 6 which is managed by the device information registration unit 311.

In step S402, the device information registration unit 311 determines whether or not unprocessed information of the network device 110 exists among the information of the one or more network devices 110 which has been obtained in step S401. In a case where the unprocessed information of the network device 110 exists, the processing proceeds to step S403. In a case where the unprocessed information of the network device 110 does not exist, the processing of the flowchart in FIG. 4 is ended.

In step S403, the device information registration unit 311 determines whether or not the status in the device connection credential information table 800 in FIG. 8 corresponding to the network device 110 set as a processing target is valid. In a case where the status is valid, since the key information has been issued to the network device 110, the processing proceeds to step S404. In a case where the status is invalid, since the key information has not been issued to the network device 110, it is determined that it is not necessary to maintain the connection with regard to the network device 110, and the processing proceeds to step S406.

In step S404, the device information registration unit 311 determines whether the management form in the device management information table 600 in FIG. 6 corresponding to the network device 110 set as the processing target is a management form in which it is necessary to maintain the connection of the network device 110. For example, in a case where the management form in the device management information table 600 is the centralized management, the device information registration unit 311 determines that the management form is a management form in which it is not necessary to maintain the connection of the network device 110. On the other hand, in a case where the management form in the device management information table 600 is the individual management, the device information registration unit 311 determines that the management form is a management form in which it is necessary to maintain the connection of the network device 110.

In the case of the management form in which it is necessary to maintain the connection of the network device 110, the processing proceeds to step S405. In the case of the management form in which it is not necessary to maintain the connection of the network device 110, the processing proceeds to step S406.

In step S405, the device information registration unit 311 keeps the information of the network device 110 in the device connection credential information table 800 to maintain the connection even when the tenant to which the network device 110 belongs is deleted, on an exceptional basis without deleting the information.

Since the network device 110 is not to be connected to the tenant which has been meant to be deleted as it is, the device information registration unit 311 registers a tenant as a changed destination in the reconnection destination tenant such that the connection destination is to be changed to the tenant of the organization which manages the tenant of the customer organization which is to be deleted.

That is, the device information registration unit 311 stores the key information or the like of the network device 110 in correspondence with the tenant without deleting the key information or the like and registers, as the reconnection destination tenant, the tenant as the changed destination. Thereafter, the processing returns to step S402, and the processing of the next network device 110 will be repeated.

In step S406, the device information registration unit 311 deletes the information of the network device 110 from the device management information table 600 and the device connection credential information table 800 in accordance with the deletion of the tenant. That is, the device information registration unit 311 deletes the key information or the like of the network device 110 in correspondence with the tenant. Thereafter, the processing returns to step S402, and the processing of the next network device 110 will be repeated.

Figure 5:
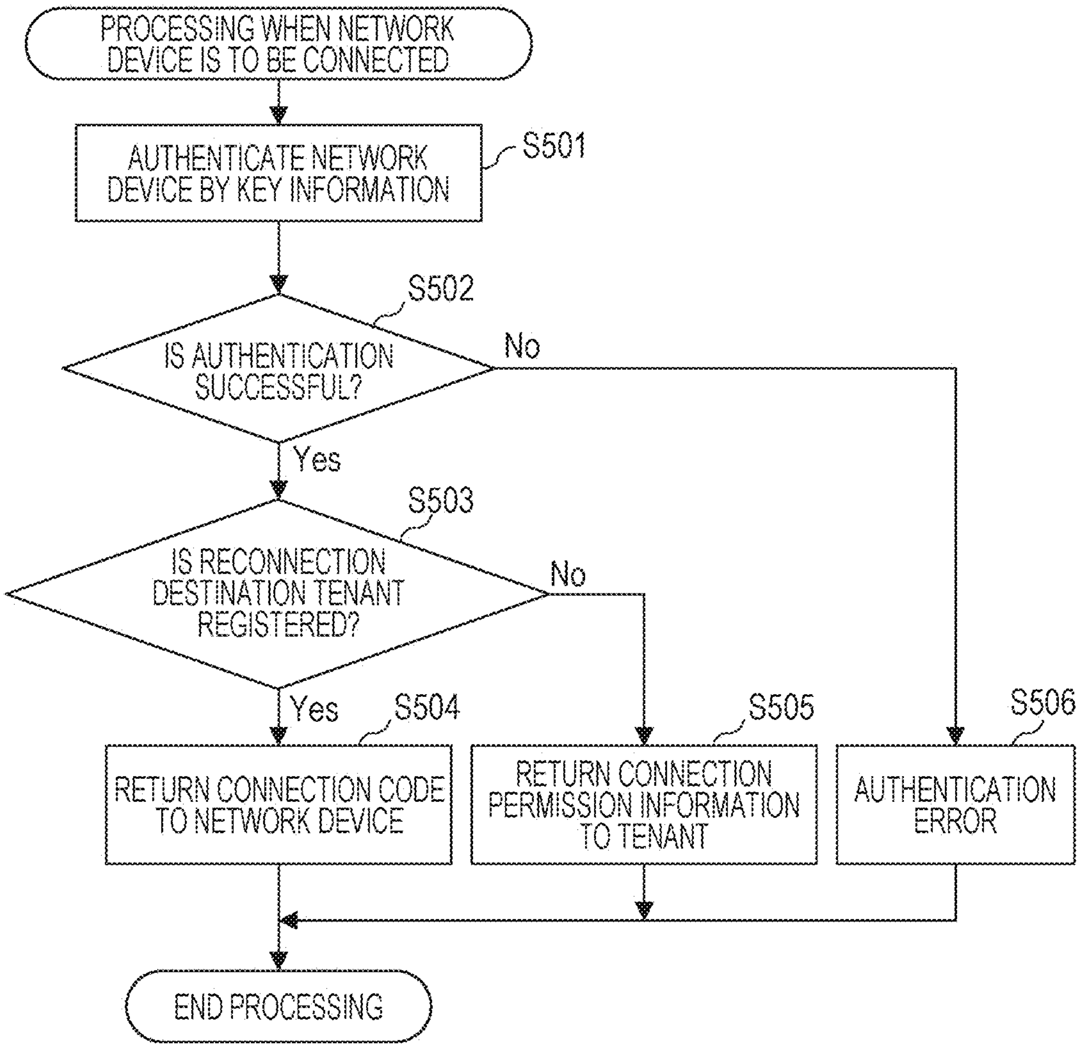
FIG. 5 is a flowchart of connection permission processing of a connection permission unit.

FIG. 5 is a flowchart illustrating a processing method for the device management server 120 according to the present embodiment. FIG. 5 is the flowchart illustrating the processing of permitting the connection from the network device 110 to which the key information has been issued, in particular, in the connection permission processing of the network device 110 in the connection permission unit 313 of the device management server 120.

Hereinafter, the connection permission processing of the connection permission unit 313 will be described following the flowchart in FIG. 5 in which the network device 110 is authenticated and the network device 110 is permitted for connection or instructed for reregistration. It is noted that the management program of the device management server 120 according to the flow in FIG. 5 is stored in the storage device 203 of the device management server 120 and read into the memory 204 to be executed by the CPU 205.

In the connection permission processing from the network device 110 to which the key information has been issued in the connection permission unit 313, first, processing in step S501 is performed.

In step S501, the connection permission unit 313 receives a connection request from the network device 110 and authenticates the network device 110 based on the key information received from the network device 110 and the device ID.

In step S502, the connection permission unit 313 determines whether or not the authentication in step S501 is successful. In a case where the authentication is successful, the processing proceeds to step S503. In a case where the authentication in step S501 has failed, the processing proceeds to step S506.

In step S503, the connection permission unit 313 obtains the information of the reconnection destination tenant of the network device 110 from the device connection credential information table 800.

Then, the connection permission unit 313 determines whether or not a tenant as a changed destination is registered as the above-described reconnection destination tenant. In a case where the tenant as the changed destination is registered, the processing proceeds to step S504. In a case where the tenant as the changed destination is not registered, the processing proceeds to step S505.

In step S504, instead of granting the permission with respect to the connection request from the network device 110, the connection permission unit 313 instructs the network device 110 to perform reconnection to the tenant as the changed destination which has been registered as the reconnection destination tenant. Specifically, the connection permission unit 313 asks the connection code issuance unit 312 to issue a connection code for identifying the tenant as the changed destination which has been registered as the reconnection destination tenant with respect to the connection request from the network device 110 and returns (transmits) the connection code to the network device 110.

Alternatively, the connection permission unit 313 returns a response for urging the network device 110 to call a request to issue a connection code. Then, when the subsequent request to issue the connection code is received from the network device 110, the connection permission unit 313 issues a connection code to connect to the tenant specified as the reconnection destination tenant to the network device 110.

The network device 110 uses the issued connection code for the connection permission unit 313 and receives an issuance of key information for transmitting data to the tenant specified as the reconnection destination tenant to switch the connection destination tenant. Thereafter, the network device 110 transmits a connection request including the issued key information of the reconnection destination tenant and the device ID to the device management server 120 so that the device management server 120 becomes connectable by the processing in FIG. 5. Thereafter, the processing in the flowchart in FIG. 5 is ended.

In step S505, the connection permission unit 313 issues connection permission information such as an access token in response to the connection request from the network device 110 and returns the connection permission information to the network device 110. The connection permission information is information for permitting the connection to the tenant corresponding to the above-described key information. As a result, the network device 110 can transmit the setting information or the operational information with the connection permission information to the device management server 120. Thereafter, the processing in the flowchart in FIG. 5 is ended.

In step S506, the connection permission unit 313 returns an authentication error to the network device 110. Thereafter, the processing in the flowchart in FIG. 5 is ended.

Thus, according to the present embodiment described in detail, even in a case where the tenant in association with the customer organization is deleted from the device management server 120, it is possible to maintain the connection of the network device 110 to the device management server 120. As a result, without performing the operation for connection on the network device 110 side again, by registering the information of the network device 110 in the new tenant in the device management server 120, the connection can be made to the new tenant.

Even in a case where the tenant is deleted from the device management server 120, the device management server 120 is allowed to be able to maintain the connection between the network device 110 and the device management server 120. As a result, without performing the operation for connection on the network device 110 side again, by registering the tenant as the changed destination of the network device 110, the device management server 120 is allowed to enable the connection to the tenant as the changed destination.

OTHER EMBODIMENTS

The present disclosure can also be realized by processing in which a program for realizing one or more functions of the above-described embodiments is supplied to a system or an apparatus via a network or a storage medium, and one or more processors in a computer of the system or the apparatus read out and execute the program. In addition, the present disclosure can be realized by a circuit (for example, an application specific integrated circuit (ASIC)) configured to realize one or more functions.

It is noted that any of the above-described embodiments merely illustrate specific examples for carrying out the present disclosure, and the technical scope of the present disclosure is not interpreted in a restrictive manner by these. That is, the present disclosure can be implemented in various forms without departing from its technical concept or main features.

According to the embodiments of the present disclosure, even in a case where the deletion of the connection destination organization is instructed, the device can be connected to a different connection destination organization.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2024-003224 filed Jan. 12, 2024, which is hereby incorporated by reference herein in its entirety.

What is claimed is:

1. A device management system comprising:

a device; and a device management server, wherein the device management server comprises one or more memories storing instructions, and one or more processors capable of executing the instructions causing the device management server to:

register, in response to a registration request, the device and a connection destination organization in the device management server in correspondence with each other;

issue a connection code for identifying the connection destination organization;

issue, in a case where a connection code received from the device is the same as the connection code for identifying the connection destination organization in correspondence with the device, key information to the device which is used for connection to the connection destination organization identified based on the connection code;

permit the device to connect to the connection destination organization in a case where authentication of the key information received from the device is successful;

store, in a case where deletion of the connection destination organization is instructed, the key information of the device in correspondence with the connection destination organization without deleting the key information, and register a connection destination organization as a changed destination;

transmit, in a case where the authentication of the key information received from the device is successful and the connection destination organization as the changed destination is registered, a connection code to the device which is used to identify the connection destination organization as the changed destination; and transmit connection permission information to the device and permit the device to connect to the connection destination organization in a case where the authentication of the key information received from the device is successful and the connection destination organization as the changed destination is not registered.

2. The device management system according to claim 1, wherein the instructions further cause the device management server to:

store, in a case where the deletion of the connection destination organization is instructed and the key information has been issued to the device, the key information of the device in correspondence with the connection destination organization without deleting the key information;

register a connection destination organization as the changed destination; and delete, in a case where the deletion of the connection destination organization is instructed and the key information has not been issued to the device, the key information of the device in correspondence with the connection destination organization.

3. The device management system according to claim 1, wherein the instructions further cause the device management server to:

store, in a case where the deletion of the connection destination organization is instructed and a management form of the device is a first management form, the key information of the device in correspondence with the connection destination organization without deleting the key information;

register a connection destination organization as the changed destination; and delete, in a case where the deletion of the connection destination organization is instructed and the management form of the device is a second management form, the key information of the device in correspondence with the connection destination organization.

4. The device management system according to claim 3, wherein the first management form is individual management, and the second management form is centralized management.

5. The device management system according to claim 1, wherein the instructions further cause the device management server to:

store, in a case where the deletion of the connection destination organization is instructed, the key information has been issued to the device, and a management form of the device is individual management, the key information of the device in correspondence with the connection destination organization without deleting the key information;

register a connection destination organization as the changed destination; and delete, in a case where the deletion of the connection destination organization is instructed, and the key information has not been issued to the device or the management form of the device is centralized management, the key information of the device in correspondence with the connection destination organization.

6. A processing method for a device management server in a device management system including a device and the device management server, the processing method comprising:

registering, in response to a registration request, the device and a connection destination organization in the device management server in correspondence with each other;

issuing a connection code for identifying the connection destination organization;

issuing, in a case where a connection code received from the device is the same as the connection code for identifying the connection destination organization in correspondence with the device, key information to the device which is used for connection to the connection destination organization identified based on the connection code;

permitting the device to connect to the connection destination organization in a case where authentication of the key information received from the device is successful;

storing, in a case where deletion of the connection destination organization is instructed, the key information of the device in correspondence with the connection destination organization without deleting the key information, and registering a connection destination organization as a changed destination;

transmitting, in a case where the authentication of the key information received from the device is successful and the connection destination organization as the changed destination is registered, a connection code to the device which is used to identify the connection destination organization as the changed destination; and transmitting connection permission information to the device and permitting the device to connect to the connection destination organization in a case where the authentication of the key information received from the device is successful and the connection destination organization as the changed destination is not registered.

* * * * *